(12) United States Patent
Callway et al.

(10) Patent No.: US 9,071,787 B2
(45) Date of Patent: Jun. 30, 2015

(54) DISPLAY INFORMATION FEEDBACK

(75) Inventors: Edward G. Callway, Toronto (CA); David Glen, Toronto (CA); Andrew Gruber, Arlington, MA (US); Gaurav Arora, Northborough, MA (US); Philip Swan, Richmond Hill (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 1124 days.

(21) Appl. No.: 11/759,633

(22) Filed: Jun. 7, 2007

(65) Prior Publication Data

US 2008/0225180 A1    Sep. 18, 2008

Related U.S. Application Data

(60) Provisional application No. 60/804,138, filed on Jun. 7, 2006.

(51) Int. Cl.
| | |
|---|---|
| *H04N 5/66* | (2006.01) |
| *H04N 5/44* | (2011.01) |
| *G09G 5/00* | (2006.01) |

(Continued)

(52) U.S. Cl.
CPC ............... *H04N 5/44* (2013.01); *G09G 5/005* (2013.01); *G09G 5/006* (2013.01); *G09G 2320/08* (2013.01); *G09G 2370/042* (2013.01); *H04N 21/4122* (2013.01); *H04N 21/4363* (2013.01)

(58) Field of Classification Search
CPC .............................. H04N 5/4401; H04N 5/265
USPC .......................................... 348/553; 345/204
See application file for complete search history.

(56) References Cited

U.S. PATENT DOCUMENTS

| | | | |
|---|---|---|---|
| 5,742,273 A | 4/1998 | Flinders et al. | |
| 6,714,253 B2 * | 3/2004 | Kim et al. | 348/556 |

(Continued)

FOREIGN PATENT DOCUMENTS

| | | |
|---|---|---|
| EP | 1 032 201 | 8/2000 |
| EP | 1 160 760 | 12/2001 |
| EP | 1 215 897 | 6/2002 |

OTHER PUBLICATIONS

Alpert, "HDTV: Who Wins, Who Loses", Barron's, Publisher: Dow Jones & Company, Inc., 4 pages, (May 23, 2005).

(Continued)

*Primary Examiner* — Jefferey Harold
*Assistant Examiner* — Omer Khalid
(74) *Attorney, Agent, or Firm* — Volpe and Koenig, P.C.

(57) ABSTRACT

In general, in an aspect, the invention provides a multimedia entertainment system including a communication link, a video source coupled to the communication link and configured to produce a video signal and provide the video signal to the communication link, a video display coupled to the communication link and configured to receive the video signal from the video source via the communication link, and to provide dynamic display characteristic information indicative of a display capability of the video display to the video source via the communication link, wherein the video source is configured to receive the dynamic display characteristic information and to produce the video signal as a function of the dynamic display characteristic information, and wherein the video display is configured to display a video image in accordance with the video signal provided by the video source.

26 Claims, 4 Drawing Sheets

(51) Int. Cl.
*H04N 21/41* (2011.01)
*H04N 21/4363* (2011.01)

(56) References Cited

U.S. PATENT DOCUMENTS

| | | | |
|---|---|---|---|
| 7,224,404 B2* | 5/2007 | An et al. | 348/584 |
| 2003/0025836 A1* | 2/2003 | An et al. | 348/584 |
| 2003/0117382 A1 | 6/2003 | Pawlowski et al. | |
| 2004/0090556 A1* | 5/2004 | Kamieniecki et al. | 348/558 |
| 2006/0290810 A1* | 12/2006 | Mallinson | 348/515 |
| 2007/0133021 A1* | 6/2007 | Lee et al. | 358/1.9 |
| 2007/0209009 A1* | 9/2007 | Huang | 715/745 |

OTHER PUBLICATIONS

Williams, "Lights! Camera! Profits!", Barron's, Publisher: Dow Jones & Company, Inc., 3 pages, (Sep. 5, 2005).
Alpert, B., "HDTV: Who Wins, Who Loses", *Barron's,* Publisher: Dow Jones & Company, Inc., 4 pages, May 23, 2005.
Williams, C.C., "Lights! Camera! Profits!", *Barron's,* Publisher: Dow Jones & Company, Inc., 3 pages, Sep. 5, 2005.

* cited by examiner

DISPLAY INFORMATION FEEDBACK

RELATED APPLICATIONS

This application claims priority to U.S. Provisional Application No. 60/804,138, filed Jun. 7, 2006, which is incorporated by reference herein in its entirety.

BACKGROUND

Modern televisions come in many shapes and sizes, and with different capabilities. Televisions can range in size from as small as a few diagonal inches to as large as over one-hundred diagonal inches. Differing display capabilities include the portion of the color spectrum which can be displayed (i.e., gamut) and the maximum/minimum resolution that can be displayed. Another difference between various televisions is how a television processes incoming information. For example, different televisions can render different portions of the color spectrum. Still other variations between televisions exist or are possible.

Televisions are typically used with a source such as a video game system, a cable box, or a DVD player. The source can provide a signal for display on the television. Complex sources, such as video game systems, can provide significant processing and rendering capabilities, which are used to generate the final image for display on the television. The source is often configured to produce signals corresponding to images with colors outside of the receiving television's (or other form of display) gamut capability. If the source sends signals corresponding to such out-of-gamut colors, the television will, for example, map the sent colors to in-gamut colors, using valuable processing time. Thus, sources often send signals corresponding to colors that will likely be in-gamut, thus not utilizing the full gamut of the television. The processing algorithms used by the source are typically set at the point of manufacture, and/or can be user-selectable (e.g., a video-game player can choose the resolution of a signal output to a television). A video signal is transmitted from the source to the television using a connection such as a DVI, HDMI, YPrPb, CVBS, S-Video connection.

The source has limited time and/or resources available for graphics processing and transmission of a video signal to a television. For example, a typical video signal consists of approximately 30 frames-per-second, which means that a complete frame must be generated approximately every 33 milliseconds (ms). To achieve this speed, various processing methods can be used such as only rendering visible portions of objects in a display space, or selectively rendering colors in each frame. Furthermore, the connection between a source and a television can have limited bandwidth placing further limitations of the transmission of a video signal from the source to the television.

SUMMARY

In general, in an aspect, the invention provides a multimedia entertainment system including a communication link, a video source coupled to the communication link and configured to produce a video signal and provide the video signal to the communication link, a video display coupled to the communication link and configured to receive the video signal from the video source via the communication link, and to provide dynamic display characteristic information indicative of a display capability of the video display to the video source via the communication link, wherein the video source is configured to receive the dynamic display characteristic information and to produce the video signal as a function of the dynamic display characteristic information, and wherein the video display is configured to display a video image in accordance with the video signal provided by the video source.

Implementations of the invention may provide one or more of the following features. The video display is configured to automatically provide updated dynamic display characteristic information to the video source after the dynamic display characteristic information changes. The video display is further configured to provide static display characteristic information to the video source. The dynamic information is indicative of characteristics of an operational profile of the video display. The dynamic display characteristic information is a resolution of a display window corresponding to the video signal provided by the video source. The dynamic display characteristic information is a processing delay associated with the video display. The dynamic display characteristic information is an aspect ratio of a window corresponding to the video signal provided by the video source. The dynamic display characteristic information is at least one of a brightness value, a contrast value, and a color temperature. The video source is further configured to provide to the video display supplemental information indicative of whether the video signal includes at least one of video information and graphics information.

In general, in another aspect, the invention provides a video display for use with a video source configured to provide a video signal, the video display including an interface configured to communicate with the video source, a display portion connected to the interface and being configured to display a video image in accordance with the video signal provided by the video source, a display characteristic information module that stores dynamic display characteristic information indicative of a display capability of the display portion, the information module being configured to update the display characteristic information after characteristics of the video display portion change, and an output module coupled to the display characteristic information module and the interface and configured to provide the dynamic display characteristic information to the video source via the interface.

Implementations of the invention may provide one or more of the following features. The output module is configured to automatically provide updated dynamic display characteristic information to the video source after the dynamic display characteristic information changes. The output module is further configured to provide static display characteristic information to the video source. The dynamic information is indicative of characteristics of an operational profile of the video display. The dynamic display characteristic information is a resolution of a display window corresponding to the video signal provided by the video source. The dynamic display characteristic information is a processing delay associated with the video display. The dynamic display characteristic information is an aspect ratio of a window corresponding to the video signal provided by the video source. The dynamic display characteristic information is at least one of a brightness value, a contrast value, and a color temperature. The video source is further configured to provide to the video display supplemental information indicative of whether the video signal includes at least one of video information and graphics information. The output module is configured to automatically push information to the video source.

In general, in another aspect, the invention provides a method for improving utilization of a video display capability of a video source, the method including storing dynamic display characteristic information indicative of a characteristic of the video display in a memory of the video display, providing the dynamic display characteristic information from the video display to a video source in signal communication with the video display, and receiving, at the video display, a video signal from the video source, the video signal being processed as a function of the display characteristic information provided by the video display.

Implementations of the invention may include one or more of the following features. The method further includes updating the dynamic display characteristic information. The method further includes providing the updated dynamic display characteristic information from the video display to the video source. The method further includes displaying a video image in accordance with the video signal received from the video source. The method further includes storing static display characteristic information indicative of a characteristic of the video display in the memory of the video display, and providing the static display characteristic information from the video display to the video source. Providing dynamic display characteristic information includes providing information indicative of characteristics of an operational profile of the video display.

In general, an another aspect, the invention provides a video display for use with a video source, the video display including an interface configured to communicate with the video source, a display portion connected to the interface and configured to display a video image in accordance with the video signal provided by the video source, a display characteristic information module that stores dynamic display characteristic information indicative of a display capability of the display portion, and an output module coupled to the interface and configured to provide the dynamic display characteristic information to the video source such that an optimized video signal is received at the interface from the video source.

Implementations of the invention may provide one or more of the following features. The output module is configured to provide updated dynamic display characteristic information to the video source automatically after the dynamic display characteristic information changes. The output module is further configured to provide static display characteristic information to the video source. The dynamic information is indicative of characteristics of an operational profile of the video display.

In general, in another aspect, the invention provides a processing unit for use with a video display, the video display being configured to provide dynamic display characteristic information to the video source, the processing unit including an input configured to receive an input video signal, an interface configured to communicate with the video display and to receive the dynamic display characteristic information, and a processor coupled and configured to receive the input video signal and the dynamic display characteristic information and to process the input video signal, as a function of the dynamic display characteristic information, to produce a processed video signal, wherein the interface is configured to provide the processed video signal to the video display.

Implementations of the invention may provide one or more of the following features. The processor is configured to adjust the processing of the input video signal after the dynamic display characteristic information is updated from the video display. The processor is further configured to process the input video signal as a function of static display characteristic information provided by the video display. The processor is configured to process the input video signal such that the processed video signal is optimized for display on the video display.

In accordance with implementations of the invention, one or more of the following capabilities can be provided. A control signal can be provided from a video display to a video source. Information relating to capabilities of a video display can be sent to a video source. Display gamut information can be sent to a source from a display. Color-management information can be sent to a source from a display. Aspect ratio information can be sent to a source from a display. Bit-depth information can be sent to a source from a display. Jitter information can be sent to a source from a display. Information relating to non-linearity of a display's backlight can be sent to a source from the display. Image processing at a video source can be adapted to a display connected to the source. Colors produced by a source can be mapped to a color gamut of a display. A video source can compensate for movement of pixels in an image. A source can use gamut information sent from a display to increase the source's rendering precision. Video signal rendering efficiency can be increased relative to prior techniques. Bandwidth between a source and a display can be used more efficiently compared to prior techniques. These and other capabilities of the invention, along with the invention itself, will be more fully understood after a review of the following figures, detailed description, and claims.

DETAILED DESCRIPTION

Embodiments of the invention provide techniques for improving utilization of a video display's capabilities and/or improving utilization of a video source's processing capability by providing information from the video display to the source. The display characteristics and processing characteristics of the display are sent by the display to the video source. The video source receives the display and processing characteristics and uses this information to produce a signal and provide the signal to the display. For example, absent the information from the display, the video source may produce signals with an over-limited color gamut. Knowing that the display has a certain color gamut that includes colors that the source would not typically indicate to produce (i.e., outside the source's default gamut), the source adjusts its processing to indicate to produce colors outside the source default gamut, and preferably inside the display's gamut, as appropriate. Other embodiments are within the scope of the invention.

Figure 1:
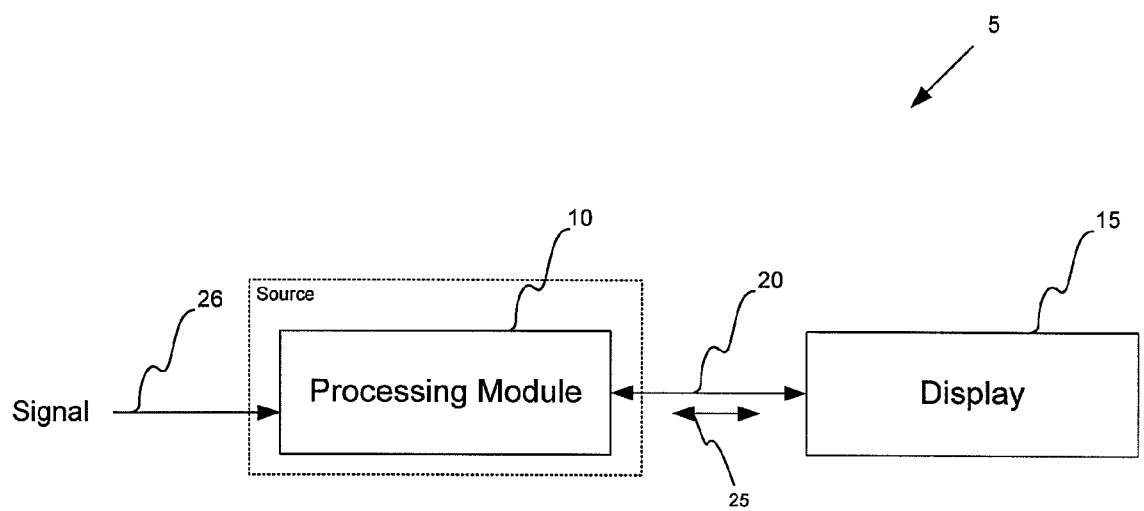
FIG. 1 is a block diagram of a display system including a processing module and a display.

Referring to FIG. 1, a video display system 5 can include a processing module 10, a display 15 and a communication link 20. The processing module 10 can be included in a video source (e.g., a video game system (e.g., an Xbox 360® video game system manufactured by Microsoft Corporation of Redmond, Wash.), a computer, a DVD player, a cable box, a satellite receiver, a server, a hard-drive recorder (e.g., a digital video recorder (DVR)), a VCR, etc.) although other configurations are possible. For example, the processing module 10 can be a stand alone unit connected to an external source. The module 10 is configured to provide, via the link 20, a video signal 25 indicative of images to be displayed. The signal 25 can be a signal 26 received by, and possibly modified by, the module 10, and/or produced partially or totally by the module 10. The processing module 10 is connected to the display 15 via the communication link 20. The communication link 20 is a bi-directional link configured to communicate information from the processing module 10 to the display 15, and from the display 15 to the processing module 10. The communication link 20 is preferably a wired connection, although other configurations are possible (e.g., a wireless link). The display 15 is configured to receive and display images according to the video signal 25 provided by the processing module 10 through the link 20. The display 15 can be, for example, an analog television, a digital television, a high-definition television, a computer monitor, a projector, etc. While a single processing module 10, a single display 15, a single communication link 20, and a single external signal 25 are shown, other quantities are possible.

The signal 25 can include information representative of a video image. For example, the signal 25 can be an uncompressed digital video stream (e.g., an HDMI or DVI signal), an analog video stream (e.g., YPrPb, CVBS, VGA, etc.), a modulated signal containing multiple channels provided by a cable television provider, a series of Ethernet packets that are reassembled and/or decoded to form a complete video stream, a broadcast received by a satellite dish or antenna, a video stream created from a DVD or other storage media, information representative of objects in a three-dimensional space, information retrieved from a hard-drive, a computer generated video signal, etc. The signal 25 can be, for example, generated by a video game system in response to a set of computer instructions (e.g., a video game disc) and user input (e.g., via a joystick). The signal 25 can be a signal generated from within the processing module 10 (e.g., the processing module 10 can be configured to generate the signal 25 using stored information such as computer instructions). The processing module 10 is configured to receive the signal 26 and convert it into information that can be displayed on the display 15. For example, the processing module 10 can be presented with information representing objects in a three-dimensional (3-D) space, which is then converted into two-dimensional (2-D) "screen space" and rendered by the processing module 10.

The display 15 can be used to display a video image to a user, such as a television show. The display 15 can present color using multiple color channels. Each color channel excites a phosphor that in turn, emits visible light (e.g., red, green, and/or blue light). The light produced by the phosphors combines to produce a single wavelength that a viewer perceives as a single color. The display 15 can be limited in its ability to present colors using multiple color channels. Thus, the display 15 includes a gamut that represents the colors that can be displayed by combining each of the color channels. The gamut is typically smaller than the entire visible spectrum of colors. Different embodiments of the display 15 can have different gamut capabilities. For instance, a computer monitor may be able to display a larger gamut than a CRT television. The gamut of the display 15 can affect the rendering process performed by the processing module 10 by, for example, affecting brightness and/or contrast levels to compensate for gamut limitations.

The display 15 can be configured to send display information to the processing module 10 relating to the characteristics and/or operational profiles of the display 15 via the communication link 20. Display information transmitted from the display 15 to the processing module 10 can include, for example:

Information representative of one or more attributes of the display 15

Information indicative of the renderable color gamut of the display 15 (e.g., indicia of a 3-D gamut contour, ranges of available values of red, green, and/or blue producible by the display, etc.)

An analog IRE level (e.g., a unit of measurement for the amplitude of analog video signals)

A resolution of the display 15 (e.g., minimum and maximum resolutions)

Jitter information

Pixel shape(s) information

Bit-depth information

Gamma correction information

Non-linearity information

Color correction information

Aspect ratio information

The size of a display window (e.g., the size of a picture-in-picture or split-screen window)

A processing delay introduced by the display 15 (e.g., so that the processing module 10 can compensate for loss of synchronization between audio and video signals)

Brightness information

Contrast information

Color temperature information

Operational profile information of the display 15 (e.g., information indicating that the user has selected a mode of the display 15 that is optimized for video game graphics)

The information provided by the display 15 can be analog or digital (e.g., packetized). The processing module 10 can be configured to receive the display information from the display 15 and configured to modify or process the signal 25 based upon the display information provided to the processing module 10 by the display 15.

The information provided by the display 15 can be dynamic and/or static. For example, dynamic characteristic information can represent characteristics of the display 15 that can change such as resolution, brightness, contrast, window-size, aspect ratio, etc. Static characteristic information can represent information that typically does not change for a given display such as display size, pixel orientation, and gamma information. Certain types of static information, however, can become dynamic if the display 15 is configured to update the associated values. For example, the display 15 can be configured to adjust gamut values as the display ages.

As the communication link 20 is bi-directional, the processing module 10 can be configured to provide additional information (e.g., in addition to the video image signal) to the display 15. For example, the processing module 10 can be configured to provide to the display 15 information that is indicative of the type of video signal being provided to the display 15 (e.g., metadata regarding the video image signal). The type of video signal can include pure video, pure graphics (e.g., an on-screen menu), and/or mixed video and graphics. The display 15 can be configured to process an incoming video signal as a function of the type of information contained therein.

Figure 2:
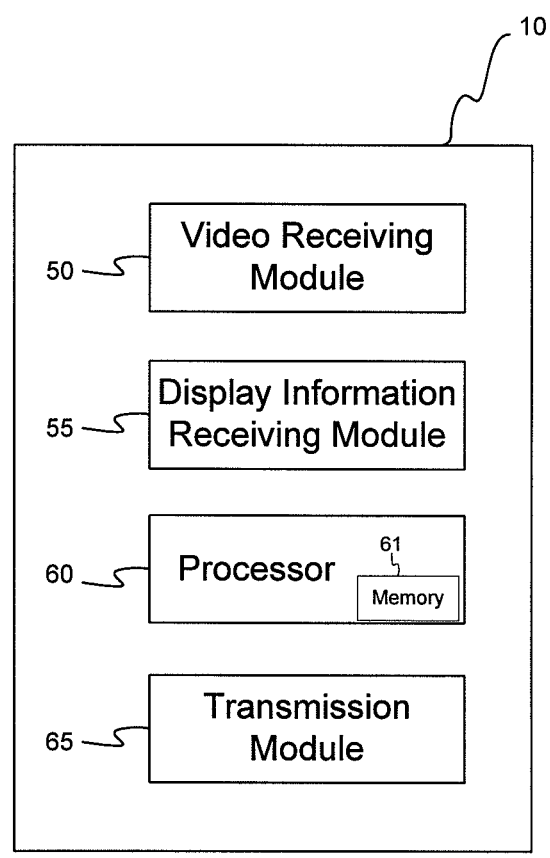
FIG. 2 is a block diagram of the display shown in FIG. 1.

Referring also to FIG. 2, the processing module 10 can include a video signal receiving module 50, a display information receiving module 55, a processor 60, and a transmission module 65. The receiving modules 50 and 55 can include software and/or hardware used in signal processing and reception, such as a demodulation module, a tuner module, a demultiplexer module, a depacketizer, a network interface card, a transceiver, etc. The processor 60 can be a microprocessor such as an AMD® Athlon® and/or Turion® (manufactured by Advanced Micro Devices of Sunnyvale, Calif.) although other processors can be used. The processor 60 includes memory 61, which is preferably RAM, although other types of memory and/or storage can be used. The processor 60 is coupled and configured to receive the external signal 26 via the receiving module 50. The transmission module 65 can be connected to the processor 60 and can include software and/or hardware used in signal processing and transmission, such as a modulation module, a multiplexor module, a packetizer, a network interface card, a transceiver, etc. While the video receiving modules 50 and 55, the processor 60, and the transmission module 65 are shown as separate components in FIG. 2, other configurations are possible. For example, the functionality provided by the receiving modules 50 and 55, the processor 60, and/or the transmission module 65 can be combined into a single component.

The processing module 10 can be configured to receive a video signal (here, the signal 26) and process it for display on the display 15. For example, the video receiving module 50 can be configured to receive the signal 26 and the display information receiving module 55 is configured to receive the display information transmitted from the display 15 via the communication link 20. The receiving module 50 can process the signal 26 into a format compatible with the processor 60 by, for example, demodulating the signal 26. The receiving module 55 can process the display information provided by the display 15 into a format compatible with the processor 60 by, for example, demultiplexing the display information received from the display 15. The receiving modules 50 and 55 are configured to transmit the processed (or possibly unprocessed) information to the processor 60. The processor 60 can perform signal processing on the signal 26 such as rendering an image to be transmitted to the display 15, color-mapping, jitter correction, resolution conversion, aspect ratio conversion, etc. The processor 60 can be configured to receive the display information from the receiving module 55 and to produce a processed video stream by processing the signal 26 as a function of the information contained within the display information provided from the display 15 (as described below). The processor 60 can be configured to transmit the processed video stream to the transmission module 65. The transmission module 65 can be coupled and configured to convert (if necessary) the processed video stream into a format compatible with the display 15, such as an MPEG2, uncompressed digital stream (e.g., HDMI, DVI), and/or analog data stream (e.g., VGA). The transmission module 65 can be configured to transmit the processed video stream 25 to the display 15. The transmission module 65 is further configured to adapt the signal processing it performs to display information that changes in real-time.

Figure 3:
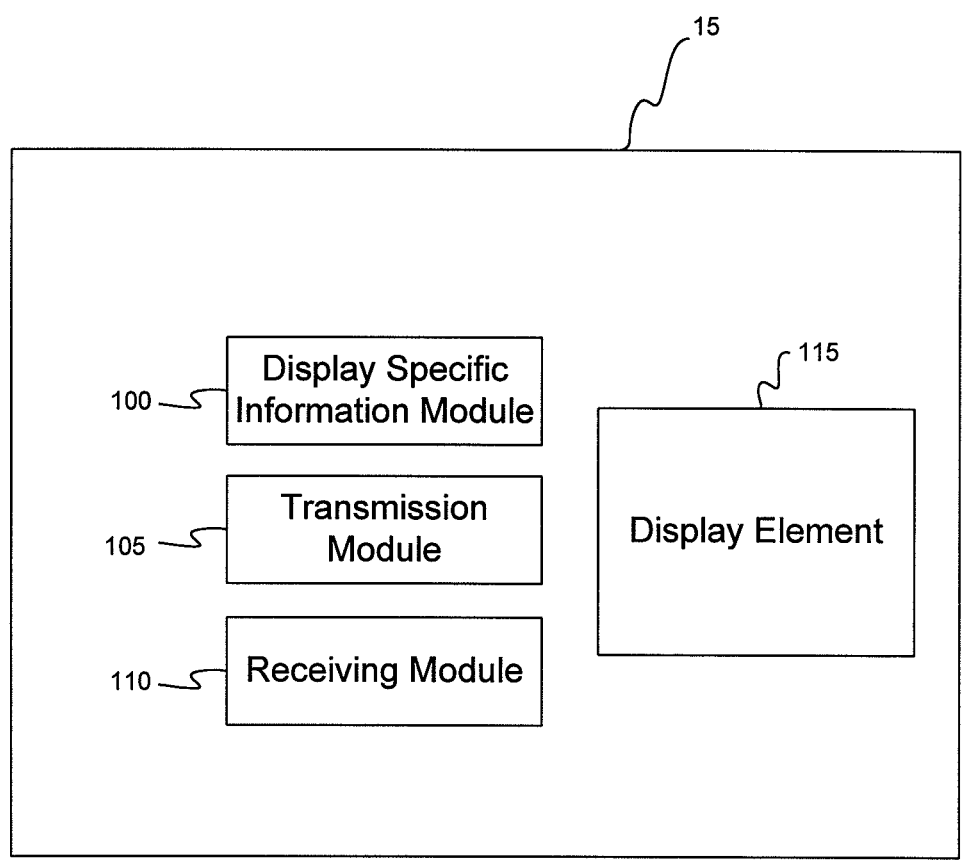
FIG. 3 is a block diagram of the processing module shown in FIG. 1.

Referring to FIG. 3, a display 15 can include a display information module 100, a transmission module 105, a receiving module 110, and a display element 115. The information module 100 can be a memory (e.g., RAM, ROM, etc.), and can include circuitry to provide the display information to the transmission module 105. The transmission module 105 preferably includes software and/or hardware used in signal processing and transmission, such as a modulation module, a multiplexor module, a packetizer, a network interface card, a transceiver, etc. The transmission module 105 can be configured and coupled to provide the display information to the processing module 10 via the communication link 20. The receiving module 110 preferably includes software and/or hardware used in signal processing and reception, such as a demodulation module, a tuner module, a demultiplexer module, a depacketizer, a network interface card, a transceiver, etc. The display element 115 is preferably a display system such as a CRT, an LCD, a plasma display, a projector, etc. The display element 115 can be configured and coupled to the receiving module 110 to receive and display the processed video stream transmitted from the processing module 10. While the information module 100, the transmission module 105, and the receiving module 110 are shown as separate components, other configurations are possible. For example, the functionality provided by the information module 100, the transmission module 105, and the receiving module 110 can be combined into a single component.

The display 15 can be preferably coupled and configured to provide display information to the processing module 10 and to display the processed video stream transmitted from the processing module 10. The information module 100 can be configured to store and provide information representing attributes of the display 15 in the form of, for example, display information including indicia of the displayable color gamut, and the display's resolution, jitter, aspect ratio, etc. The transmission module 105 can query the information module 100 for the display information, or alternatively, the information module 100 can automatically provide the display information to the transmission module 105 at predetermined times. Other information sharing arrangements are possible. The transmission module 105 can be preferably coupled and configured to process (as appropriate) the display information into a format compatible with the processing module 10. For example, different embodiments of the processing module 10 may expect different information in different formats (e.g., Ethernet packets, SMS packets, proprietary data packets, etc.). The transmission module 105 can be preferably configured to transmit the information to the processing module 10 via the communication link 20. The information module 100 can provide the display information to the processing module 10 at various times. For example, the information module 100 can provide the display information each time the processing module 10 is coupled to the display 15, at predetermined intervals (e.g., every 10 minutes), or when a predetermined event occurs (e.g., when the resolution of the video signal 25 changes). The information module 100 can be configured to "push" information to the processing module 10, or can be configured to provide information upon request (e.g., "pull"). The information module 100 can also be configured to provide the display information as it is updated (e.g., in real- or quasi real-time each time the display window size changes, the information module 100 provides updated display information to the processing module 10). The receiving module 110 can be coupled and configured to relay the processed video stream 25 provided by the processing module 10 to the display element 115 for display. The receiving module 110 can perform signal processing on the processed video stream 25 prior to transmitting the processed video stream 25 to the display element 115, such as removing header information, demultiplexing the processed video stream, etc.

Figure 4:
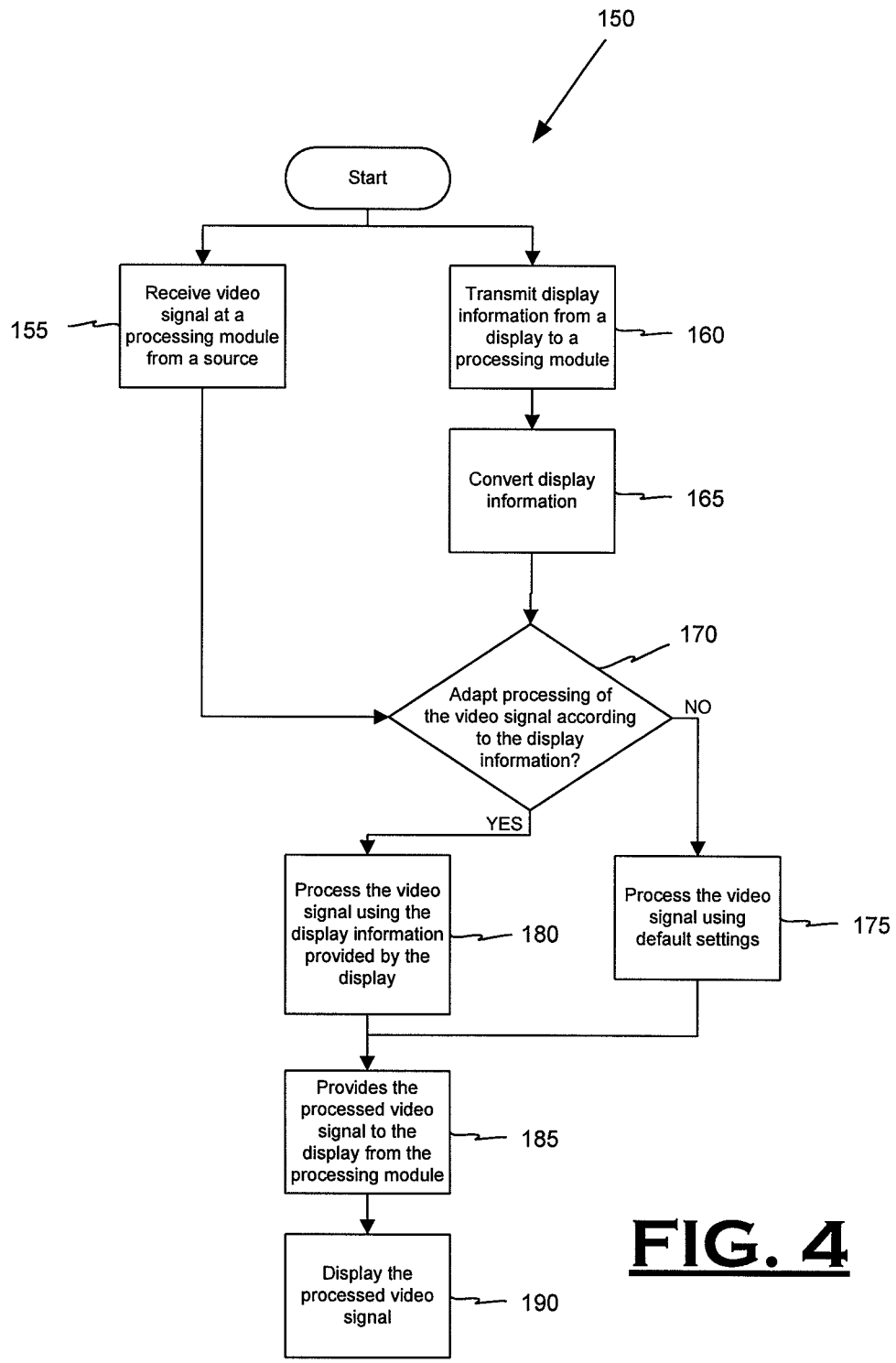
FIG. 4 is a block flow diagram of a process of using display information provided by a display to optimize a video signal for display on the display.

In operation, referring to FIG. 4, with further reference to FIGS. 1-3, a process 150 for display initiated management during rendering using the video display system 5 includes the stages shown. The process 150, however, is exemplary only and not limiting. For example, the process 150 may be altered, e.g., by having stages added, removed, combined, or rearranged.

At stage 155, the signal processing module 10 receives the video signal 26 provided by one or more sources to the processing module 10. For example, an external cable service provider can provide a cable signal to the processing module 10, a video game processor can generate a video signal based on computer instructions and user input, etc. The receiving module 50 forwards the signal 26 to the processor 60. The receiving module 50 performs signal processing on the signal 26 to convert the signal 26 into a format compatible with the processor 65 by, for example, demodulation (e.g., when the receiving module 50 is a tuner), demultiplexing, depacketizing, Fourier transform, inverse Fourier transform, converting the signal 25 from one standard to another (e.g., MPEG2 to MPEG4), etc.

At stage 160, the display 15 can broadcast display information to the processing module 10. The information module 100 provides to the transmission module 105 information representative of operational attributes (e.g., operational profile information) of the display 15. The gamut of the display is indicated using, for example, indicia of a 3-D gamut contour, ranges of values of red, green, and/or blue producible by the display, etc. The display information also includes indicia of the display's maximum/minimum resolution, jitter information, pixel shape(s) information, bit-depth information, non-linearity information, color correction information, aspect ratio, etc. The transmission module 105 provides the display information to the processing module 10 at various times, such as when the display 15 detects a new source being connected, each time the display 15 is turned on, at periodic time intervals (e.g., every hour), when queried by the processing module 10, etc. The transmission module 105 receives the display information from the information module 100 and processes the display information into a format compatible with the processing module 10 (as appropriate). The transmission module 105 provides the display information to the processing module 10 via the communication link 20. The transmission module 105 provides the signal to the processing module 10 using analog and/or digital transmissions. For example, analog information such as IRE levels can be provided, while color information can be encoded by an amplitude of a carrier wave, etc. The transmission module 105 can provide a digital signal (e.g., an Ethernet packet) with values corresponding to the display information of the display 15. While the information module 100 has been described as providing the display information to the transmission module, other configurations are possible. For example, the transmission module 105 may query the information module 100 for the display information.

At stage 165, the processing module 10 receives display information provided by the display 15. The receiving module 55 detects and converts, as appropriate, the display information provided by the display 15 into a format compatible with the processor 60. The receiving module 55 provides the display information provided by the display 15 to the processor 60. While the receiving module 50 and the receiving module 55 are discussed in the stages 155 and 165, respectively, the functionality provided by the receiving modules 50 and 55 can be combined into a single component.

At stage 170, the processor 60 receives the display information from the receiving module 55. The processor 60 determines whether to adapt the processing of the signal 26 according to the display information provided by the display 15. If the processor 60 decides to change the processing the signal 25 due to the display information provided by the display 15 (e.g., as determined by a user), the process 150 proceeds to stage 180, and otherwise the process 150 proceeds to stage 175 where the processor 60 processes the signal 26, according to a preprogrammed default algorithm.

At stage 180, the processor 60 processes/renders the signal 26 into the processed video signal 25 using the display information provided by the display 15. For example, without the display information, the processor 60 may produce the signal 25 with colors that the display 15 is incapable of displaying (e.g., the display 15 has a relatively limited gamut). Once the gamut of the display 15 is known to the processor 60 (via the display information provided by the display 15), the processor 60 produces the signal 25 in accordance with the display information, e.g., to better use the capabilities of the display 15 or otherwise provide a signal that can be better used by the display 15. For example, the processor 60 maps colors outside of the gamut of the display 15 to colors within the gamut of the display 15. Likewise, colors within the gamut of the display 15 can be mapped to other colors within and/or outside of the gamut of the display 15 (e.g., color correction). For example, if some colors in the processor's 60 gamut are outside of the display's 15 gamut, the colors can be mapped to colors inside the display's 15 gamut. Furthermore, the "mapped-to" colors can be re-mapped (e.g., for a second time) to another color within the processor's 60 gamut (e.g., to reduce how many colors outside of the display's 15 gamut are mapped to a single color within the display's 15 gamut). The gamut that the processor 60 produces is based on the gamut information provided by the display 15.

Other types of processing using the display information are possible. For example, the processor 60 reduces (or increases) the resolution of the signal 25 if the default resolution of the signal 25 is higher (or lower) than a resolution that the display 15 can display (or a window size). The processor 60 adjusts its processing to produce the signal 25 with an aspect ratio in accordance with the aspect ratio of the display 15. The processor 60 converts, as appropriate, a high-definition version of the signal 25 into a standard-definition signal for display on the display 15. The processor 60 can increase the rendering precision by increasing the number of bits used to represent color and/or gamma correction information. The processor 60 provides the processed video signal to the transmission module 65.

At stage 185, the processed video stream is further processed (if necessary) before being transmitted to the display 15. For example, the transmission module 65 can convert the format of the processed video signal into a format compatible with the display 15 (e.g., MPEG2, uncompressed digital, and/or analog). The transmission module 65 can also process the signal for transmission to the display 15 by, for example, packetizing the processed video signal, modulating the processed video signal, multiplexing the processed video signal, encrypting the processed video signal, etc. Alternatively, part and/or all of the functionality provided by the transmission module 65 can be provided by the processor 60.

At stage 190, the display 15 receives the processed video signal. The receiving module 110 can process (if necessary) the processed video by, for example, depacketizing the processed video signal, demodulating the processed video signal, demultiplexing the processed video signal, decrypting the processed video signal, etc. The processed video signal is displayed on the display element 115.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

While the communication link 20 is shown as a single connection, other configurations are possible. For example, the communication link 20 may be a single bi-directional connection (e.g., a bi-directional fiber optic connection). Alternatively, two separate unidirectional links configured to provide bi-directional communication between the processing module 10 and the display 15 can be used. For example, a DVI connection can be used to provide a video signal to the display 15 from the processing module 10, and an Ethernet connection can be used to provide display information from the display 15 to the processing module 10. The communication link 20 can also be a network, such as the Internet. Data packets representing a video signal can be transmitted by the processing module 10 to the display 15, and likewise, the display 15 can transmit data packets representing display information to the processing module 10.

While the video display system 5 and the process 150 are discussed in the context of a video signal, the system 5 and/or the process 150 can also be used in audio processing. For example, the display information can include information representative of audio frequency spectrum that the display can produce, the number of speakers attached to the display 15 (e.g., stereo sound versus surround-sound), the audio processing capability of the display 15 (e.g., can the display 15 decode surround-sound signals), a desired input level, etc.

Referring to FIG. 1, while the receiving modules 50 and 55, and the transmission module 65 have been described as separate components, other configurations are possible. For example, the receiving modules 50 and 55, and/or the transmission module 65 may be a single component (e.g., a transceiver).

While a single processing module 10, a single display 15, and a single signal 25 have been disclosed, other quantities and/or configurations are possible. For example, the processing module 10 can receive display information from several displays, from which multiple processed video signals can be produced, each processed video signal being optimized for a different display. Multiple signals can processed for a single display (e.g., when using picture-in-picture).

Further, while the description above refers to the invention, the description may include more than one invention.

What is claimed is:

1. A multimedia entertainment system comprising:
   a communication link;
   a video source coupled to the communication link and configured to produce a video signal and provide the video signal to the communication link; and
   a video display coupled to the communication link and configured to receive the video signal from the video source via the communication link, to provide dynamic display characteristic information indicative of a display capability of the video display to the video source via the communication link, and to automatically provide updated dynamic display characteristic information to the video source in response to a change in the dynamic display characteristic information;
   wherein the dynamic display characteristic information includes an indication of a color gamut of the video display;
   wherein the video source is configured to receive the dynamic display characteristic information, determine whether to adapt processing of the video signal according to the dynamic display characteristic information including a mapping of colors outside the color gamut of the video display to colors within the color gamut of the display in response to receiving the color gamut information, and to produce the video signal as a function of the dynamic display characteristic information; and
   wherein the video display is configured to display a video image in accordance with the video signal provided by the video source.

2. The system of claim 1 wherein the video display is further configured to provide static display characteristic information to the video source.

3. The system of claim 1 wherein the dynamic information is indicative of characteristics of an operational profile of the video display.

4. The system of claim 1 wherein the dynamic display characteristic information is a resolution of a display window corresponding to the video signal provided by the video source.

5. The system of claim 1 wherein the dynamic display characteristic information is an aspect ratio of a window corresponding to the video signal provided by the video source.

6. The system of claim 1 wherein the dynamic display characteristic information is at least one of a brightness value, a contrast value, and a color temperature.

7. The system of claim 1 wherein the video source is further configured to provide to the video display supplemental information indicative of whether the video signal includes at least one of video information and graphics information.

8. A video display for use with a video source configured to provide a video signal, the video display comprising:
   an interface configured to communicate with the video source;
   a display portion connected to the interface and being configured to display a video image in accordance with the video signal provided by the video source;
   a display characteristic information module that stores dynamic display characteristic information indicative of a display capability of the display portion, wherein the dynamic display characteristic information includes an indication of a color gamut of the video display; the information module being configured to update the display characteristic information after characteristics of the video display portion change;
   an output module coupled to the display characteristic information module and the interface and configured to provide the dynamic display characteristic information to the video source via the interface and to automatically provide updated dynamic display characteristic information to the video source in response to a change in the dynamic display characteristic information; and
   a receiving module coupled to the interface for receiving a video signal from the video source, the video signal being processed as a function of the display characteristic information provided by the video display including a mapping of colors outside the color gamut of the video display to colors within the color gamut of the display in response to the color gamut information.

9. The video display of claim 8 wherein the output module is further configured to provide static display characteristic information to the video source.

10. The video display of claim 8 wherein the dynamic information is indicative of characteristics of an operational profile of the video display.

11. The video display of claim 8 wherein the dynamic display characteristic information is a resolution of a display window corresponding to the video signal provided by the video source.

12. The video display of claim 8 wherein the dynamic display characteristic information is an aspect ratio of a window corresponding to the video signal provided by the video source.

13. The video display of claim 8 wherein the dynamic display characteristic information is at least one of a brightness value, a contrast value, and a color temperature.

14. The video display of claim 8 wherein the video source is further configured to provide to the video display supplemental information indicative of whether the video signal includes at least one of video information and graphics information.

15. The video display of claim 8 wherein the output module is configured to automatically push information to the video source.

16. A method for improving utilization of a video display capability of a video source, the method comprising:
storing dynamic display characteristic information indicative of a characteristic of the video display in a memory of the video display, wherein the dynamic display characteristic information includes an indication of a color gamut of the video display;
providing the dynamic display characteristic information from the video display to a video source via a bi-directional signal communication link;
automatically updating the dynamic display characteristic information in response to a change in the dynamic display characteristic information; and
receiving, at the video display, a video signal from the video source, the video signal being processed as a function of the display characteristic information provided by the video display including a mapping of colors outside the color gamut of the video display to colors within the color gamut of the display in response to the color gamut information.

17. The method of claim 16 further comprising displaying a video image in accordance with the video signal received from the video source.

18. The method of claim 16 further comprising:
storing static display characteristic information indicative of a characteristic of the video display in the memory of the video display; and
providing the static display characteristic information from the video display to the video source.

19. The method of claim 16 wherein providing dynamic display characteristic information includes providing information indicative of characteristics of an operational profile of the video display.

20. A processing unit implemented in a video source device that is coupled to a video display, the processing unit comprising:
an input configured to receive an input video signal;
an interface configured to communicate with the video display and to receive dynamic display characteristic information, wherein the dynamic display characteristic information includes an indication of a color gamut of the video display; and
a processor configured to receive the input video signal, to receive the dynamic display characteristic information automatically in response to a change in the dynamic display characteristic information, to determine whether to adapt the processing of the video signal according to the dynamic display characteristic information, and to process the input video signal, as a function of the dynamic display characteristic information, to produce a processed video signal;
wherein the processing the input video signal includes a mapping of colors outside the color gamut of the video display to colors within the color gamut of the display in response to receiving the color gamut information;
wherein the interface is configured to provide the processed video signal to the video display.

21. The processing unit of claim 20 wherein the processor is further configured to process the input video signal as a function of static display characteristic information provided by the video display.

22. The processing unit of claim 20 wherein the processor is configured to process the input video signal such that the processed video signal is optimized for display on the video display.

23. A video source device, comprising:
the processing unit of claim 20, wherein the interface is coupled to a bi-directional communication link,
a receiving module coupled to the processor and configured to receive the dynamic display characteristic information from the video display on the communication link, the display information related to characteristics of the video display, wherein the receiving module is further configured to receive the input video signal and to convert the input video signal for processing by the processor.

24. A method implemented by a video source device, comprising:
using a bi-directional communication link between the video source device and a video display;
receiving display information from a video display, the display information related to characteristics of the video display that includes an indication of a color gamut of the video display, and the display information received automatically in response to a change in the dynamic display characteristic information;
receiving a video source signal intended for the video display;
determining whether to adapt a processing of the received video source signal according to the received display information including a mapping of colors outside the color gamut of the video display to colors within the color gamut of the display in response to receiving the color gamut information; and
providing video signal information to the video display, via the communication link, the video signal information related to a video signal being sent to the video display, whereby the video display is configured to process the video signal as a function of the video signal information.

25. The system of claim 1, wherein the video source is further configured to determine whether to adapt processing of the video signal according to the dynamic display characteristic information including producing colors outside the default gamut of the video source and within the color gamut of the video display in response to receiving the color gamut information.

26. The system of claim 1, wherein the communication link is wired or wireless.

* * * * *